May 11, 1965     T. R. BROGAN     3,183,381

ELECTROMAGNET

Filed Aug. 27, 1962     2 Sheets-Sheet 1

THOMAS R. BROGAN
INVENTOR.

BY Alden D. Redfield
Melvin E. Frederick
ATTORNEYS

May 11, 1965     T. R. BROGAN     3,183,381
ELECTROMAGNET
Filed Aug. 27, 1962                              2 Sheets-Sheet 2
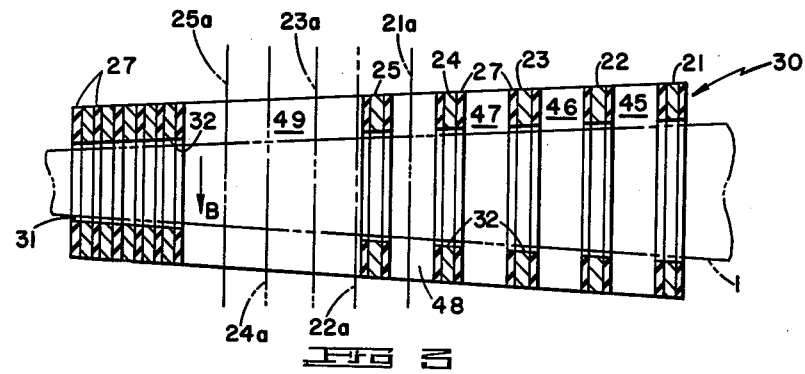
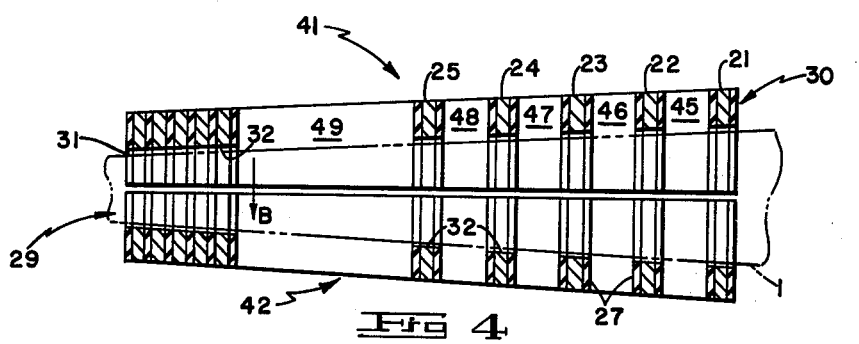
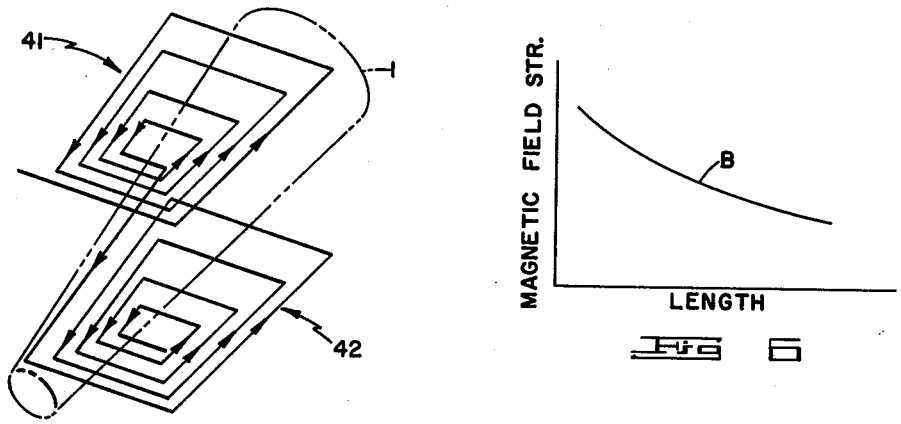
THOMAS R. BROGAN
INVENTOR.
BY Alden D. Redfield
Melvin E. Frederick
ATTORNEYS

3,183,381
ELECTROMAGNET
Thomas R. Brogan, Arlington, Mass., assignor to Avco Corporation, Cincinnati, Ohio, a corporation of Delaware
Filed Aug. 27, 1962, Ser. No. 219,689
4 Claims. (Cl. 310—11)

The present invention relates to electro magnets and more particularly to improved electro magnets for providing magnetic field variations in a region extending generally in the direction of current flow and through the magnet.

Field magnets, such as are used to furnish the magnetic field in magnetohydrodynamic (hereinafter referred to as "MHD") devices, such as, for example, generators, often operate at low voltages but require large currents of the order of thousands of amperes. Such large currents make it necessary that the conductors forming the turns of these magnets have large cross sections which cannot be easily formed into the required shape.

Stated briefly, an MHD generator is a device for generating electricity in which a conductive gas or vapor is conveyed at high temperature and velocity, by means of a duct, through a magnetic field wherein the kinetic energy of the gas is directly converted into electric current.

The magnetic field is produced by currents and magnetic conductors in the vicinity of the generator duct. These conductors may be made of any material which is a good conductor of electricity. In practice, of course, the highest electrical conductivity is desired in order that the power dissipation required to produce a given magnetic field may be minimized. The best practical room temperature material for such magnets is copper, although aluminum and silver might be considered. A room temperature copper coil is shown and described in patent application, Serial No. 92,537, filed March 1, 1961.

The magnetic field produced for a given power dissipation (or current distribution in the case of a superconductor) is determined by the geometric arrangement of the conductors. In the magnet described in the aforementioned patent application, the current flows in opposite directions in two spaced conductors. The current flow in these conductors produces a magnetic field normal to the direction of current flow. In the ideal case, the conductors extend to infinity in both directions.

In the magnet disclosed in the aforementioned patent application, the conductors are flat plates whose width dimension is for the most part normal to the axis of the coil. With this method of construction, "saddle-shaped" ends are required since in this case the conductors do not extend to infinity in both directions and openings must be provided at oppositely disposed ends of the magnet into which a generator duct, for example, may be inserted. Practical considerations, therefore, give rise to the so-called "saddle-shaped" coil winding. "Saddle-shaped" ends leads to a considerable penalty with regard to net power dissipation and magnetic field uniformity near the ends of the magnet. This occurs because of the relatively long length of conductors which must exist outside of the region where the field is desired and because the currents in that portion of the conductors are removed from the magnetic field region.

Also, as disclosed in patent application, Serial No. 79,678, filed December 30, 1960, it is desirable to generate a magnetic field which varies with axial position along the axis of the duct. Provision of a magnetic field which varies with axial position along the working section of the duct of an MHD generator, for example, is desirable firstly, to obtain a uniformed voltage at all points along the working section of the generator.

If the generator duct remains geometrically similar along its length, a uniform voltage at all points along the working section of the duct can be achieved approximately by putting $$B = B_0 \sqrt{\frac{P}{P_0}}$$

where $B_0$ and $P_0$ are respectively the magnetic field and gas pressure values at the duct inlet and B and P are respectively the local values of $B_0$ and $P_0$. The local values B and P generally decrease in the downstream direction. Secondly, a varying magnetic field is desirable to prevent undesirable Hall effects. The magnitude of the Hall effect is roughly proportional to the ratio of the magnetic field strength divided by the gas pressure. Since the gas pressure decreases as the gas flows through the duct, it is desirable to reduce the magnetic field strength as the pressure decreases.

In accordance with the present invention, a winding having a plurality of axes is provided comprising conductors in the form of a ribbon, strip or plates forming a coil winding with the width dimension parallel at all points to the aforementioned axes of the winding. Oppositely disposed passages are provided in the conductors to permit a generator duct or the like to be passed through the winding. For a generally rectangular coil winding, the turns, however, are not all of substantially the same length and are brought across the gap or magnetic field region at predetermined intervals along the length thereof. Stated differently, the end portions of the turns, for example, the end portions at the inlet of a generator duct, are concentrated or closely spaced and the opposite end portions of at least some of the turns are in spaced relationship one with another.

As will now be apparent, the amount of conductor involved in the ends of the coil winding is much less than in the "saddle-shaped" configuration. Thus, the power dissipation in the end portions of the coil winding is much reduced and the current in the end portions of the coil winding is much closer to the region where the field is desired than in the case of the "saddle-shaped" geometry.

By reason of the cross-over feature, the field provided by the current in a given turn does not contribute to the field downstream of the point of cross over. Thus, the magnetic field is made to decrease in the direction of the more widely spaced end portions of the turns of the coil winding. Any desired field distribution may be produced, depending on the schedule by which the turns are made to cross the magnetic field region enclosed by the turns. Each turn contains two oppositely disposed passages of appropriate size such that a generator duct or the like can pass through the turn.

The general object of the present invention is to provide a conductive coil winding wherein the winding conductor has a large cross section and is formed to provide a passage through the coil winding perpendicular to the axis of the winding to provide a magnetic field that varies in the direction of said passage.

Another object of the present invention is the provision of a high-field strength magnet comprised of individual turns formed from ribbons, strips or the like of insulated conductive material wound up into a conductive coil winding with the width dimension parallel to the axis of the coil winding wherein the turns of the coil winding are brought across the magnetic field region at intervals in a direction normal to the axes of the turns whereby a magnetic field is provided that varies in a direction normal to the axes of the turns.

The novel features that are considered characteristic of the present invention are set forth in the appended claims. The invention itself, however, both as to its organization and method of operation, together with additional objects and advantages thereof, will best be understood from the following description of a specific embodiment when read in conjunction with the accompanying drawings, in which:

FIGURE 3 is a cross-sectional view taken on line 3—3 of FIGURE 2;

FIGURE 4 is a cross-sectional view of a modification of the embodiment shown in FIGURE 2;

FIGURE 5 is a schematic diagram showing the electrical circuit provided by the magnet when constructed in two parts as shown in FIGURE 4; and FIGURE 6 is a graphic illustration showing variation of magnetic field strength.

Figure 1:
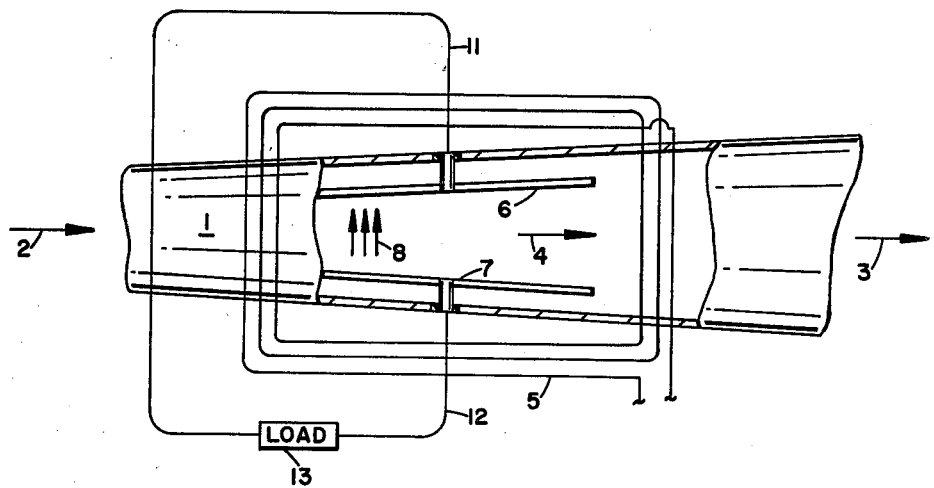
FIGURE 1 is a diagrammatic illustration of an MHD generator.

A knowledge of the general principles of MHD generators will promote an understanding of the present invention. For this reason, there is shown in FIGURE 1 a schematic diagram of an MHD generator. As illustrated in that figure, the generator comprises a duct, generally tapered and designated by the numeral 1, to which high temperature, high pressure, electrically conductive gas or plasma is introduced, as indicated by the arrow at 2, and from which it exhausts, as indicated by arrow at 3. The pressure at the exit of the duct is lower than at its inlet; and for this reason the plasma moves at high velocity through the duct, as indicated by the arrow at 4. By properly choosing the pressure differential and shape of the duct, the plasma can be made to move through the duct at substantially constant velocity, which is desirable, although not necessary, to the operation of the generator. Surrounding the exterior of the duct is a continuous electrical conductor in the form of a winding 5 to which a unidirectional electrical current may be supplied from any conventional source or from the generator itself. Flow of electrical current through the winding establishes a magnetic flux through the duct perpendicular to the direction of plasma flow and the plane of the paper. The construction and operation of a room temperature winding is disclosed in patent application, Serial No. 92,537, filed March 1, 1961.

Within the duct are provided opposed electrodes 6 and 7. These electrodes may extend along the interior of the duct parallel to the direction of plasma movement and may be positioned opposite one another on an axis perpendicular to both the direction of plasma movement and the magnetic flux. High velocity movement of the electrically conductive plasma through the magnetic field induces a unidirectional electromotive force between the electrodes, as indicated by the arrows at 8.

The electrodes 6 and 7 are connected by conductors 11 and 12 to a load 13 through which electrical current flows under the influence of the electromotive force induced between the electrodes.

From the foregoing description, it will be immediately recognized that an MHD generator of the type described employs a stationary magnetic field and unidirectional gas flow. As a result, such a generator is inherently a source of direct current. If alternating current is desired, specially designed generators or auxiliary equipment must be provided to invert the direct current to alternating current.

Figure 2:
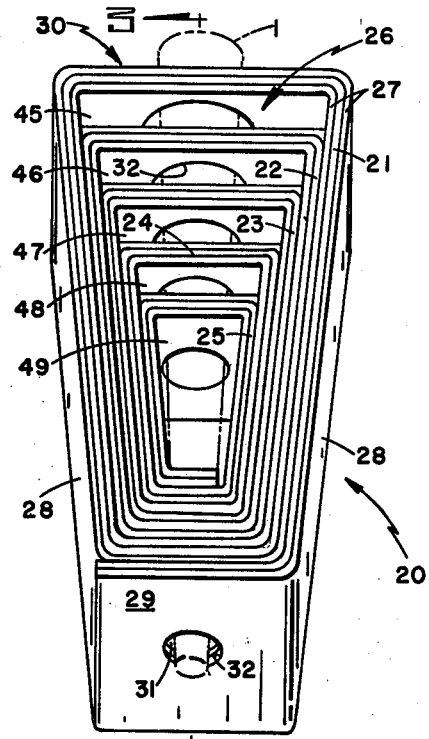
FIGURE 2 is an isometric view of a magnet constructed in accordance with the present invention for use in an MHD generator, the spacing of the turns having been exaggerated and the duct having been shown in phantom in order to reveal the passages in the end portions of the turns.

The magnet shown in FIGURE 2 and in FIGURE 3 includes a winding 20 comprised of a plurality of serially connected turns 21-25. Five turns, serially connected one within another, are shown by way of example and for purposes of illustration.

A magnetic field region 26 is defined by the outermost turn 21 of the coil winding 20. Insulation 27 such as Mylar having a thickness of about .010 inch is provided to insulate the turns one from another and from any necessary supporting structure.

Beginning with the innermost turn 25, the winding may be formed by bending a strip of suitably insulated conductive material, for example copper, to form a turn of the desired configuration which may, for example, be generally rectangular as shown in FIGURE 2. Alternately, the turns may be comprised of sections welded or brazed together to facilitate manufacture and assembly of the winding and/or to most simply provide variations in the thickness of the conductive material. All of the succeeding turns are then formed on top of the preceding turn much in the same manner that conventional coils are wound. However, the middle portions 28 of the turns and the end portions 29 of the turns at one end of the coil (the left-hand end as shown in FIGURE 2) are closely spaced one from another whereas the end portions 30 opposite end portions 29 of the turns are brought across the magnetic field region 26 at different points. Thus, the end portions 30 of the turns at one end of the coil winding are spaced a greater distance one from another than the opposite end portions 29 of the turns. Such a construction provides a coil winding having a plurality of turns wherein the axes $21a$–$25a$ of the turns (see FIGURE 3) all lie in the same plane but are in spaced relationship one with another. The end portions 29 and 30 of each turn are pierced to provide a passage 31 through the end portions of the coil winding and normal to the axes of the turns. The width dimensions of the conducting material are parallel to the axes of the turns; hence, it follows that the oppositely disposed openings 32 in each turn are normal to the width dimension of the conducting material. The aforementioned passage 31 is provided so that a duct or the like may be passed through the coil winding normal to the axes of the turns.

The end portions 29 and 30 of the turns are preferably somewhat thicker than the middle portions 28 to prevent the concentration of current in the vicinity of the openings 32 in the end portions. The concentration of current in the vicinity of the openings 32 may cause excessive power dissipation and heating.

The impedance of a magnet of a given size is determined principally by the number of turns. If a high impedance is desired, the number of turns may become excessive and, thus, the insulation between turns may occupy a large fraction of the coil volume which reduces the packing factor and increases power dissipation. This difficulty may be avoided at least to a limited extent by making the coil in two sections 41 and 42, each of which includes one half the openings 32 in the end portions of the turns as illustrated in FIGURE 4.

With reference now to FIGURES 4 and 5, the two sections 41 and 42 may be stacked on top of each other and connected in series. The thickness of the conducting material for this arrangement should be about twice that of the single section construction shown in FIGURE 2 and FIGURE 3. The electrical circuit provided by the dual section arrangement shown in FIGURE 4 is shown in FIGURE 5.

As will now be evident, all of the turns in the coil winding do not run the full length of the coil. Instead, the end portion of at least some of the turns are led across the magnetic field region at significantly different points. Since the current in an inner turn (turn 25, for example) does not contribute to the magnetic field exterior thereof, the magnetic field strength in the magnetic field region decreases in the direction of the more widely spaced end portions of the turns as illustrated in FIGURE 6. Any desired field distribution may be produced by varying the schedule by which the turns are made to cross the magnetic field region.

The turns which are crossed over the magnetic field region, as well as the entire coil winding, should be reinforced to withstand the magnetic stresses induced during start up, operation and shut down of the coil. For the turns adjacent the perimeter of the coil winding, the forces, in general, are outward. The turns crossing over the magnetic coil region are subjected to a force, in general, normal to the axes of the turns, the force being distributed over the portion of the turns crossing the magnetic field region.

The turns may, for example, be reinforced by the provision of suitable noncompressive and nonmagnetic material in the spaces 45–49 between the turns. Displacement of the outer periphery of the coil may be suitably prevented by the provision, for example, of I beams interconnected by stress members as generally disclosed in patent application, Serial No. 92,537, filed March 1, 1961.

The various features and advantages of the invention are thought to be clear from the foregoing description. Various other features and advantages not specifically enumerated will undoubtedly occur to those versed in the art, as likewise will many variations and modifications of the embodiments illustrated, all of which may be achieved without departing from the spirit and scope of the invention as defined by the following claims.

I claim:

1. In an electric magnet for providing a high strength magnetic field through a duct transverse of the longitudinal axis of said duct the combination comprising a winding having a plurality of serially connected turns, each turn comprising a strip of conductive metal whose width dimension is substantially everywhere parallel to the axis of said turn, normal to the longitudinal axis of said duct and greater than the maximum dimension of said duct parallel to the axes of and enclosed by said turns, each said turn having opposed first and second end portions transverse of the longitudinal axis of the said duct and a middle portion parallel to the longitudinal axis of said duct, said first end portions being closely spaced and at least some of said second end portions being spaced from other of said second end portions a distance greater than that of said first end portions.

2. In an electric magnet for providing a high strength magnetic field through a duct transverse of the longitudinal axis of said duct the combination comprising a winding having a plurality of serially connected turns, each turn comprising a strip of conductive metal whose width dimension is substantially everywhere parallel to the axis of said turn, normal to the longitudinal axis of said duct and greater than the maximum dimension of said duct parallel to the axes and of enclosed by said turns, each said turn having opposed first and second end portions transverse of the longitudinal axis of the said duct and a middle portion parallel to the longitudinal axis of said duct, said first end portions being spaced one from another a predetermined distance and at least some of said second end portions being spaced from other of said second end portions a distance greater than that of said first end portions whereby at least some of said turns have different axes.

3. In an electric magnet for providing a high strength magnetic field through the duct of an MHD device transverse of the longitudinal axis of said duct the combination comprising a winding having a plurality of serially connected turns, each turn comprising a strip of conductive metal whose width dimension is substantially everywhere parallel to the axis of said turns, normal to the longitudinal axis of said duct and greater than the maximum dimension of said duct parallel to the axes of and enclosed by said turns, each said turn having opposed first and second end portions transverse of the longitudinal axis of the said duct and a middle portion parallel to the longitudinal axis of said duct, said first end portions being closely spaced one from another a predetermined distance and at least some of said second end portions being spaced from other of said second end portions a distance greater than that of said first end portions whereby at least some of said turns have different axes, said first and second end portions being pierced to provide a passage through said winding normal to the axes thereof to receive said duct.

4. In an electric magnet for providing a high strength magnetic field through the duct of an MHD device transverse of the longitudinal axis of said duct the combination comprising a winding having a plurality of serially connected turns enclosing a magnetic field region, each turn comprising a flat strip of conductive metal whose width dimension is considerably greater than its thickness dimension, said width dimension being substantially everywhere parallel to the axis of said turn, normal to the longitudinal axis of said duct and greater than the maximum dimension of said duct parallel to the axes of and enclosed by said turns, each said turn having opposed first and second end portions transverse of the longitudinal axis of the said duct and a middle portion parallel to the longitudinal axis of said duct, said first end portions and middle portions being respectively closely spaced one from another a predetermined distance and at least some of said second end portions being brought across said magnetic field region at different points and spaced from other of said second end portions a distance greater than that of said first end portions whereby at least certain of said turns have different axes, said first and second end portions being pierced to provide oppositely disposed openings in said winding normal to said width dimensions to receive said duct.

References Cited by the Examiner

UNITED STATES PATENTS

| | | | |
|---|---|---|---|
| 525,698 | 9/94 | Eichemeyer | 310—208 |
| 1,278,924 | 9/18 | Hellmund | 310—180 |
| 2,258,415 | 10/41 | Lago | 310—11 |
| 2,473,257 | 6/49 | Potter | 310—180 X |

MILTON O. HIRSHFIELD, *Primary Examiner.*

DAVID X. SLINEY, *Examiner.*

UNITED STATES PATENT OFFICE
CERTIFICATE OF CORRECTION

Patent No. 3,183,381                                                May 11, 1965

Thomas R. Brogan

It is hereby certified that error appears in the above numbered patent requiring correction and that the said Letters Patent should read as corrected below.

Column 1, line 57, for "leads" read -- lead --; column 5, line 50, for "and of" read -- of and --.

Signed and sealed this 16th day of November 1965.

(SEAL)
Attest:

ERNEST W. SWIDER                                        EDWARD J. BRENNER
Attesting Officer                                       Commissioner of Patents